United States Patent [19]
Edwards

[11] Patent Number: 6,073,525
[45] Date of Patent: Jun. 13, 2000

[54] METHOD AND APPARATUS FOR ALIGNING TOOLS PROVIDED ON A C-FRAME

[75] Inventor: Cyril Kenneth Edwards, Leicester, United Kingdom

[73] Assignee: Ariel Industries PLC, United Kingdom

[21] Appl. No.: 09/117,075

[22] PCT Filed: Feb. 3, 1997

[86] PCT No.: PCT/GN97/00286

§ 371 Date: Jul. 23, 1998

§ 102(e) Date: Jul. 23, 1998

[87] PCT Pub. No.: WO97/27972

PCT Pub. Date: Aug. 7, 1997

[30] Foreign Application Priority Data

Feb. 3, 1996 [GB] United Kingdom .................. 9602223

[51] Int. Cl.⁷ .................................................. B21D 37/00
[52] U.S. Cl. .................................. 83/34; 83/859; 29/465; 72/455
[58] Field of Search ............................ 83/36, 859, 639.1, 83/639.7, 615, 664, 665; 29/465; 227/51, 53; 72/455, 456

[56] References Cited

U.S. PATENT DOCUMENTS

| | | | |
|---|---|---|---|
| 2,296,051 | 9/1942 | Pocock et al. | |
| 2,893,488 | 7/1959 | Schott . | |
| 3,247,783 | 4/1966 | Hammon . | |
| 3,303,774 | 2/1967 | Shiokawa . | |
| 3,557,442 | 1/1971 | Speller . | |
| 3,561,252 | 2/1971 | Norton et al. . | |
| 3,874,070 | 4/1975 | Falcioni | 29/526 |
| 3,877,298 | 4/1975 | Narang | 73/81 |
| 3,991,602 | 11/1976 | Harcuba et al. | 72/455 |
| 4,078,462 | 3/1978 | Lancaster et al. | 83/146 |
| 4,192,058 | 3/1980 | Falcioni | 29/526 A |
| 4,321,819 | 3/1982 | Kraft et al. | 72/456 |
| 4,393,570 | 7/1983 | Frick et al. | 29/560 |
| 4,869,148 | 9/1989 | Tucker | 86/43 |
| 4,907,480 | 3/1990 | Kuroyone | 83/552 |
| 4,908,928 | 3/1990 | Mazurik et al. | 29/525.1 |
| 4,922,744 | 5/1990 | Stursberg | 72/455 |
| 4,951,495 | 8/1990 | Van Daalen et al. | 72/455 |
| 4,998,943 | 3/1991 | Roberts et al. | 29/432.2 |
| 5,025,691 | 6/1991 | Deni | 83/685 |
| 5,037,020 | 8/1991 | Sell | 227/58 |
| 5,060,362 | 10/1991 | Birke et al. | 29/525.2 |
| 5,086,639 | 2/1992 | Wallman | 74/455 |
| 5,097,734 | 3/1992 | Hunter et al. | 83/639.1 |
| 5,222,289 | 6/1993 | Michalewski et al. | 29/524.1 |
| 5,425,262 | 6/1995 | Dubugnon | 72/455 |
| 5,706,693 | 1/1998 | Chubb et al. | 72/294 |

FOREIGN PATENT DOCUMENTS 61154798  7/1986  Japan .

*Primary Examiner*—M. Rachuba
*Assistant Examiner*—Stephen Choi
*Attorney, Agent, or Firm*—Ira S. Dorman

[57] ABSTRACT

Tools (3, 4) mounted on the free ends of the arms of a C-frame applicator are aligned by providing the arms of the C-frame (1) in a form which is capable of flexing between a first position in which the axes of the tools (3, 4) are disposed at an angle relative to each other and a second position in which the axes of the tools are coaxial with each other. A workpiece (6) is arranged between the tools and a predetermined clamping load is applied to the workpiece (6) sufficient to flex the C-frame (1) from the first position towards the second position and bring the tools (3, 4) substantially into coaxial alignment. One or more of the tools (3, 4) is then actuated to apply a force to the workpiece (6).

12 Claims, 2 Drawing Sheets

METHOD AND APPARATUS FOR ALIGNING TOOLS PROVIDED ON A C-FRAME

BACKGROUND OF THE INVENTION

This invention relates to a method and an apparatus for aligning tools provided on a C-frame applicator.

C-frame applicators are used with suitable tools provided at the free ends of the C-frame which involve applying force at a point remote from the edge of a workpiece for the purpose of either fastening the workpiece by such means as riveting, clinching or welding; or clamping, drilling, forming, or piercing the workpiece; or bringing other components into engagement with the workpiece in an assembly operation.

In current practice, applicators for this purpose are normally constructed with C-frames which have sufficient rigidity to carry the required load with minimal deflection. One major disadvantage of such high rigidity C-frames is that they are inevitably heavy and bulky. C-frames could carry the same loads with far less weight and bulk if greater deflection under load was permissible This is a point of great significance because heavy, bulky applicators cannot readily be carried on prime movers such as economically sized robots.

SUMMARY OF THE INVENTION

An object of the present invention is to provide a design which permits greater C-frame deflection whilst retaining the desired relative alignment of the tools over at least part of the operating cycle during which a force is applied to a workpiece.

According to one aspect of the present invention there is provided a method for aligning tools mounted on the free ends of the arms of a C-frame applicator comprising the steps of:

providing a C-frame the arms of which are capable of flexing between a first position in which the axes of the tools are disposed at an angle relative to each other and a second position in which the axes of the tools are coaxial with each other;

arranging a workpiece between the tool;

applying a predetermined clamping load to the workpiece to flex the C-frame from the first position towards the second position and bring the tools substantially into coaxial alignment; and thereafter actuating one or more the tools to apply a force to the workpiece.

According to another aspect of the present invention there is provided apparatus for aligning tools mounted on the free ends of the arms of a C-frame applicator, wherein:

the arms of the C-frame are capable of flexing between a first position in which the axes of the tools are disposed at an angle relative to each other and a second position in which the axes of the tools are coaxial with each other;

means is provided for applying a predetermined clamping load to the workpiece to flex the C-frame from the first position towards the second position and bring the tools substantially into coaxial alignment; and means is provided for actuating one or more of the tools to apply a force to the workpiece.

The clamping load need not be sufficient to flex the arms of the C-frame fully from the first position to the second position. Flexing to the second position can be accomplished with the aid of the force applied to the workpiece by the tools. For example, in the case of riveting the force applied to the workpiece by the tools may be such that the arms of the C-frame are flexed to the second position when the force exerted by the tools is sufficient to cause the rivet to begin penetration of the workpiece.

The predetermined clamping load may be constant, but it can be advantageous if the clamping load is reduced from the predetermined level as the force applied by the one or more tools to the workpiece is increased. The result of the reduction in the clamping load is that the total applied load can be maintained substantially constant with the consequence that the flexure of the C-frame remains substantially constant.

Thus the present invention provides an applicator incorporating a C-frame which is capable of maintaining a desired relative alignment of a first (upper) tool on one arm of the frame and a second (lower) tool on the other arm during at least part of the time when the tools are under load.

In many fastening, forming or assembly operations, the most important stage in terms of alignment is the workpiece entry stage, i.e. when the rivet, drill or the like enters the workpiece. By ensuring that the workpiece is clamped in a manner such that the tools are coaxial at the workpiece entry stage, the present invention ensures accurate alignment of the tools at least in the entry stage and, if desired, during the entire operating cycle.

Mounting the tools so that they come into alignment when the clamping force is applied is beneficial even when there is no provision for reducing the clamping force. Having the tools in alignment after clamping force is applied ensures, not only that there is correct tool alignment at the critical entry stage of the operating cycle, but also that any subsequent misalignment is limited to that generated substantially by the operating load alone.

It may be desirable if the clamping load is not reduced below a predetermined minimum as the force applied by the one or more tools to the workpiece is increased.

The initial clamping load may be less than the maximum force applied by the one or more tools to the workpiece. Alternatively, the initial clamping load may be substantially the same as the maximum force applied by the one or more tools to the workpiece.

For a better understanding of the present invention and to show more clearly how it may be carried into effect reference will now be made, by way of example, to the accompanying drawings in which:

DETAILED DESCRIPTION OF THE ILLUSTRATED EMBODIMENT

Figure 1:
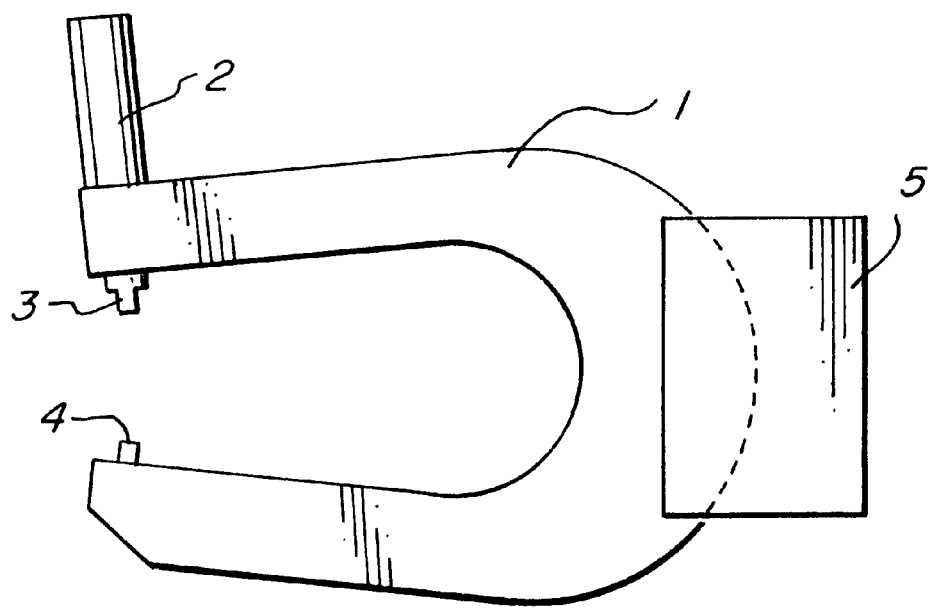
FIG. 1 shows a C-frame applicator in its free state with upper and lower tools out of alignment.

FIG. 1 shows an applicator comprising a C-frame 1 with an hydraulic cylinder 2, an upper tool 3 on one arm of the C-frame and a setting die 4 on the other arm. The C-frame is mounted on a prime mover, such as a robot, by way of a compensator 5 to allow limited freedom of motion in one or more planes.

The C-frame can be constructed from a flexible carbon fibre material. The C-frame can be manufactured by outwardly flexing the arms of the frame prior to machining mounting blocks for the tools. If the arms are flexed over the distance they will flex under the predetermined clamping load, and the tool mounting blocks are then machined so that the tools are in the correct coaxial alignment when mounted with the C-frame in its flexed configuration, the tools will adopt the desired coaxial alignment when the predetermined workpiece clamping load is applied.

The C-frame shown in FIG. 1 is in its free (unflexed) state and the upper tool and lower tool are therefore not in alignment.

Figure 2:
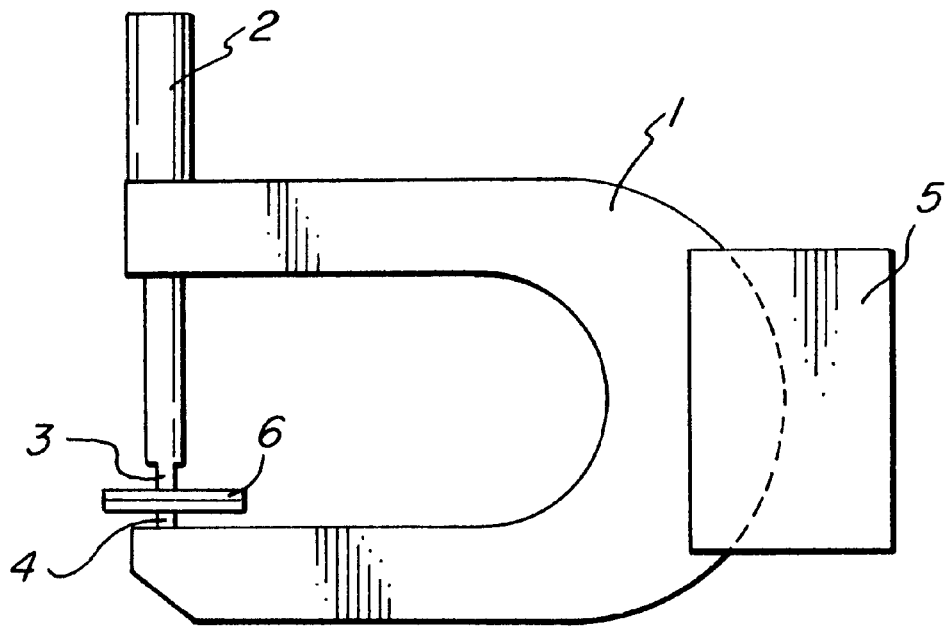
FIG. 2 shows the C-frame applicator of FIG. 1 under load with the tools in coaxial alignment.

FIG. 2 shows the applicator of FIG. 1 with the upper and lower tools applying a load to workpiece 6. The flexure of the C-frame is such that the upper and lower tools are in coaxial alignment.

When the upper and lower tools are mounted out of the desired alignment and are brought into alignment by clamping and/or other pressure applied to a workpiece, the point of workpiece contact moves relative to the C-frame. This is because the tools pivot as the arms of the C-frame flex, thus moving the point of workpiece contact towards and away from the base of the C-frame where the two arms are interconnected. If the workpiece itself is not free to move, it is necessary to ensure that the C-frame is movable relative to the workpiece during the operating cycle because otherwise there would be a possibility of the tools skidding on the workpiece surface as the arms of the C-frame flex with the consequent risk, for example, that the workpiece surface could be damaged. This can readily be achieved by mounting the C-frame on a compensator mechanism such as that described in International Patent Publication No. WO 94/02267.

Figure 3:
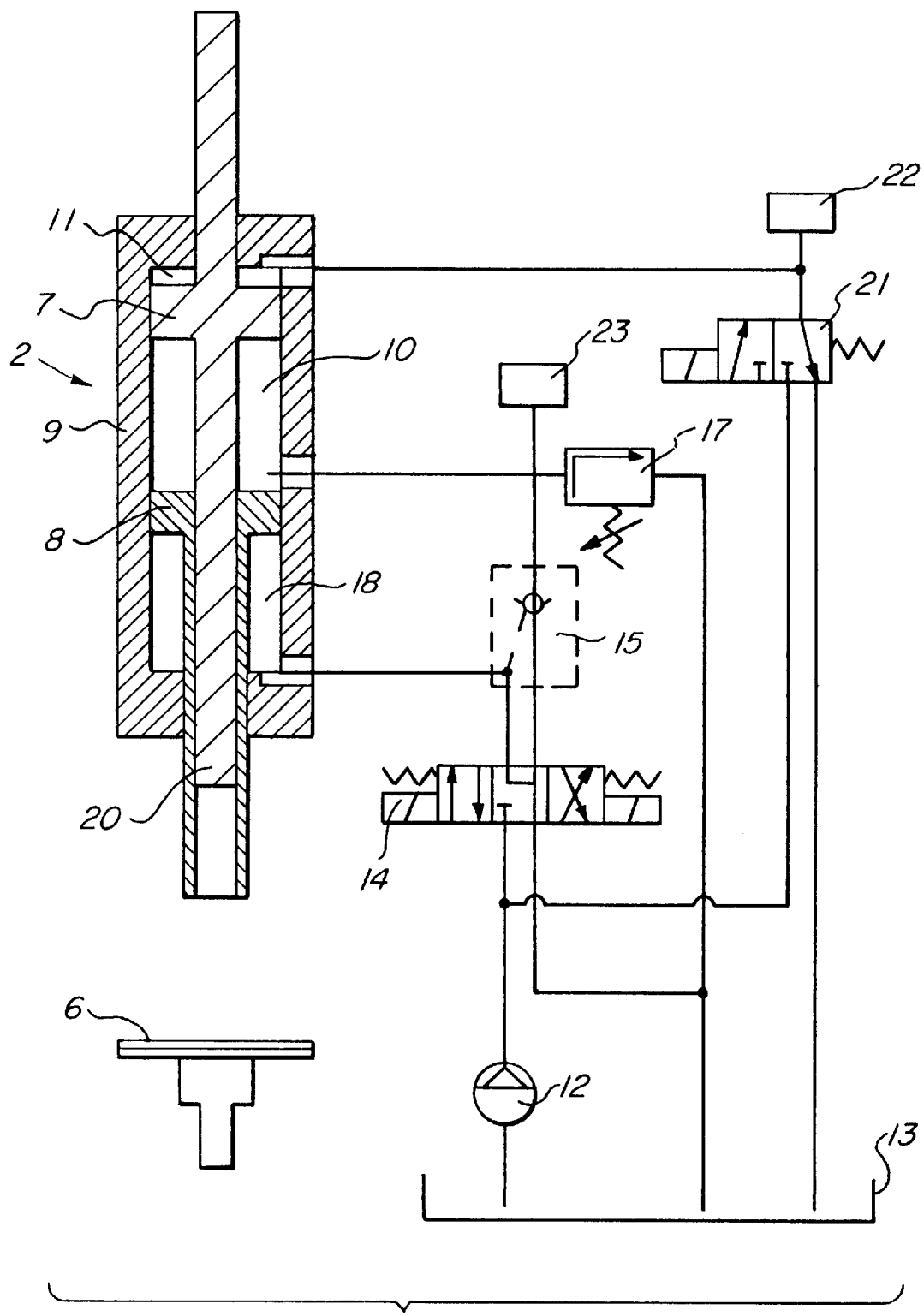
FIG. 3 is a cross-sectional view of one embodiment of an hydraulic cylinder for use with the applicator of FIGS. 1 and 2.

FIG. 3 shows a sectional view of an hydraulic cylinder 2 with a piston 7 and a clamping piston 8 operating in-line within a cylinder 2. A cavity 10 is provided within the cylinder 2 intermediate the pistons 7 and 8, with a cavity 11 provided above the piston 7 and a cavity 18 provided beneath the piston 8.

When cavity 11 is pressurised, piston 7 is subject to a downward force equal to the area of the piston exposed to fluid in cavity 11 multiplied by the fluid pressure in cavity 11. It is also subject to an upward force equal to the area of the piston exposed to fluid in cavity 10 multiplied by the fluid pressure in cavity 10. If, as is illustrated in FIG. 3, the area of piston 7 exposed to fluid in cavity 10 is equal to the area of piston 8 exposed to the same fluid, then the upward force on piston 7 is equal to the clamping load, and hence the net downward force applied by piston 7 to the tools at any point in time is equal to the area of piston 7 exposed to cavity 11 multiplied by the pressure of the fluid in cavity 11 minus the clamping load.

If the fluid in cavity 10 is pressurised to provide a clamping load equal to the load which is to be applied to the workpiece by the tools and the pressure of the fluid in cavity 11 is raised to provide a downward force on piston 7 equal to the clamping load, piston 7 will be in equilibrium and the only load applied to the C-frame will be the clamping load. Reducing the fluid pressure in cavity 10 automatically transfers the load from the clamping mechanism to the tools without a bringing the tools out of alignment because the flexing of the C-frame remains. unchanged.

If the fluid pressure in cavity 11 is raised to a level which provides a downwards force on piston 7 greater than the clamping load, piston 7 will move downwards to apply an operating force to the workpiece equal to the force on piston 7 minus the clamping load. The excess load will, of course, flex the C-frame and thereby bring the tools out of alignment, but the misalignment will be limited to that caused by the excess load. Reducing the fluid pressure in cavity 10 again automatically transfers the clamping load to the tools without causing any further tool misalignment.

Control of the fluid pressure in the cavities 10, 11 and 18 can be effected by means of directional valves 14 and 21.

Directional valve 14 can be moved to a first position to connect a pump line 12 to a cavity 10 in cylinder 2 intermediate the pistons 7 and 8 by way of a pilot operated check valve 15. In this configuration piston 7, which operates a main plunger 20, is forced upwardly as shown in FIG. 3, and piston 8, which operates a clamping mechanism, is forced downwardly to bring the clamping mechanism into contact with a workpiece 6 and to apply a predetermined clamping force. As piston 7 rises, the hydraulic fluid in a cavity 11 above the piston 7, as shown in FIG. 3, is discharged directly to a tank 13 (illustrated diagrammatically in FIG. 3). As piston 8 descends, the hydraulic fluid in a cavity 18 beneath piston 8 is discharged directly to tank 13.

Directional valve 14 can be moved to a second position to connect cavity 18 directly to the tank 13 and to connect cavity 10 to the tank 13 through a programmable pressure relief valve 17. In this configuration, the hydraulic pressure in cavity 10 is controlled by programmable relief valve 17.

Directional valve 21 can be moved to a first position to connect pump line 12 to cavity 11. When the fluid pressure in cavity 11 rises to the point where the downward force on piston 7 is greater than the upward force on piston 7 from the fluid in cavity 10, piston 7 will move downwards discharging fluid from cavity 10 through programmable pressure relief valve 17. When a tool connected to plunger 20 contacts the workpiece 6 it will apply a pressure to the workpiece equal to the downward force on piston 7 minus the upward force on piston 7. If now the settings of programmable pressure relief valve 17 are reduced, the fluid pressure in cavity 10 will drop thereby reducing the clamping force on the workpiece 6 and increasing the operating force applied by the tooling. When the fluid pressure in cavity 11, as measured by a pressure switch 22, and the fluid pressure in cavity 10, as measured by a pressure switch 23, have reached the desired levels, directional valve 21 can be moved to a second position connecting cavity 11 to tank 13 and directional valve 14 can be moved to a third position connecting cavity 18 to pump line 12 and connecting cavity 10 to the tank 13 via pilot operated check valve 15. In this configuration, piston 8 and piston 7 will rise thereby retracting the clamping mechanism and the tools from the workpiece 6.

What is claimed is:

1. A method for aligning tools (3, 4) mounted on free ends of the arms of a C-frame applicator comprising the steps of:

providing a C-frame (1) having arms which are capable of flexing between a first position in which axes of tools (3, 4) mounted thereon are angularly inclined relative to each other with their axes intersecting, and a second position in which the axes of the tools are coaxial with each other, at least one of the mounted tools being capable of actuation to apply force;

arranging a workpiece (6) between the mounted tools;

applying by means of the arms a predetermined clamping load to the workpiece (6) to flex the C-frame (1) from the first position towards the second position and bring the tools (3, 4) substantially into coaxial alignment; and after applying the predetermined clamping load, actuating the at least one tool (3, 4) to apply a force to the workpiece (6).

2. A method according to claim 1, wherein the predetermined clamping load is substantially constant.

3. A method according to claim 1, wherein the clamping load is reduced from the predetermined level as the force applied by the at least one tool (3, 4) to the workpiece (6) is increased.

4. A method according to claim 3, wherein the clamping load is not reduced below a predetermined minimum as the force applied by the at least one tool (3, 4) to the workpiece (6) is increased.

5. A method according to claim 1, wherein a clamping load prior to actuation of the at least one tool is less than a maximum force applied by the at least one tool (3, 4) to the workpiece (6).

6. A method according to claim 1, wherein a clamping load prior to actuation of the at least one tool is substantially the same as a maximum force applied by the at least one tool (3, 4) to the workpiece (6).

7. A C-frame applicator incorporating apparatus for aligning tools (3, 4) mounted on free ends of arms thereto, at least at one of the mounted tools being capable of actuation to apply force, wherein:

the arms of the C-frame (1) are capable of flexing between a first position in which axes of the mounted tools are angularly inclined relative to each other with their axes intersecting, and a second position in which the axes of the mounted tools are coaxial with each other;

means (2) is provided on the arms for applying a predetermined clamping load to the workpiece (6) to flex the C-frame (1) from the first position towards the second position and bring the tools (3, 4) substantially into coaxial alignment; and means (2) is provided for actuating at least one of the tools (3, 4) to apply a force to the workpiece (6).

8. A C-frame applicator as claimed in claim 7, wherein the predetermined clamping load is substantially constant.

9. A C-frame applicator as claimed in claim 7, wherein the clamping load is reduced from the predetermined level as the force applied by the at least one tool (3, 4) to the workpiece (6) is increased.

10. A C-frame applicator as claimed in claim 9, wherein the clamping load is not reduced below a predetermined minimum as the force applied by the at least one tool (3, 4) to the work-piece (6) is increased.

11. A C-frame applicator as claimed in claim 7, wherein a clamping load prior to actuation of the at least one tool is less than a maximum force applied by the at least one tool (3, 4) to the workpiece (6).

12. A C-frame applicator as claimed in claim 7, wherein a clamping load prior to actuation of the at least one tool is substantially the same as a maximum force applied by the at least one tool (3, 4) to the workpiece (6).

* * * * *